Dec. 19, 1933.  P. DE MATTIA  1,940,582
VULCANIZING PRESS
Filed Jan. 14, 1930  8 Sheets-Sheet 1

INVENTOR
Peter De Mattia
BY
Morrison Kennedy Campbell
ATTORNEYS

Dec. 19, 1933.   P. DE MATTIA   1,940,582
VULCANIZING PRESS
Filed Jan. 14, 1930   8 Sheets-Sheet 2

Dec. 19, 1933.　　P. DE MATTIA　　1,940,582
VULCANIZING PRESS
Filed Jan. 14, 1930　　8 Sheets-Sheet 3

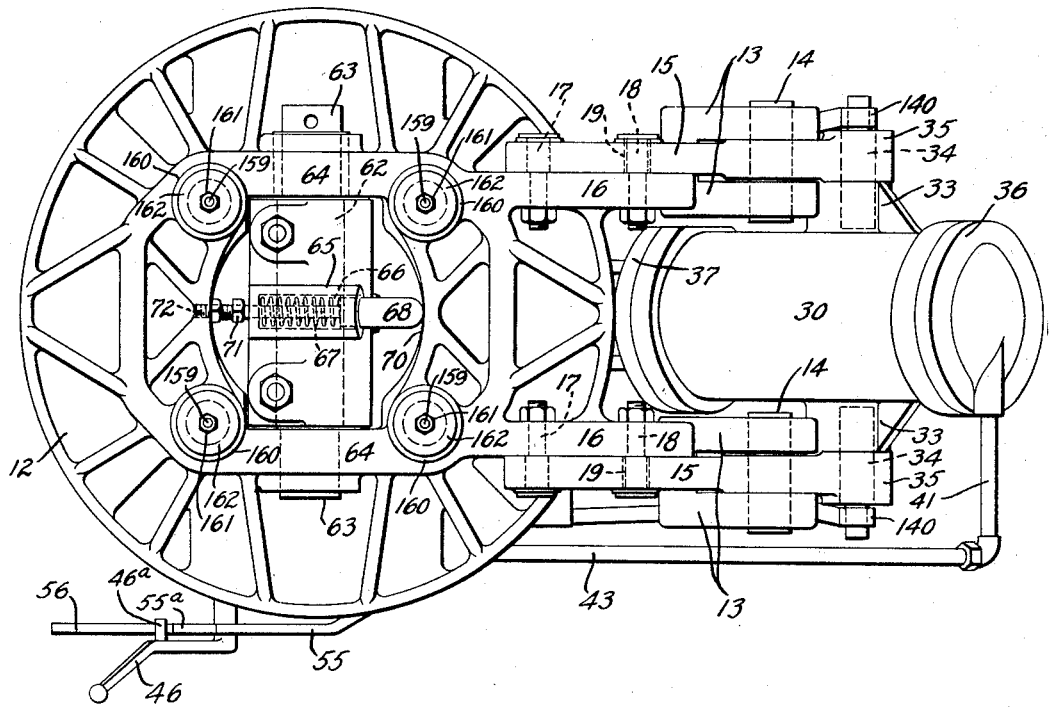

Dec. 19, 1933.　　　P. DE MATTIA　　　1,940,582

VULCANIZING PRESS

Filed Jan. 14, 1930　　　8 Sheets-Sheet 5

INVENTOR
Peter De Mattia
BY
Morrison Kennedy Campbell
ATTORNEYS

Dec. 19, 1933. P. DE MATTIA 1,940,582
VULCANIZING PRESS
Filed Jan. 14, 1930 8 Sheets-Sheet 7

INVENTOR
Peter De Mattia
BY
ATTORNEYS

Dec. 19, 1933.        P. DE MATTIA        1,940,582
VULCANIZING PRESS
Filed Jan. 14, 1930        8 Sheets-Sheet 8
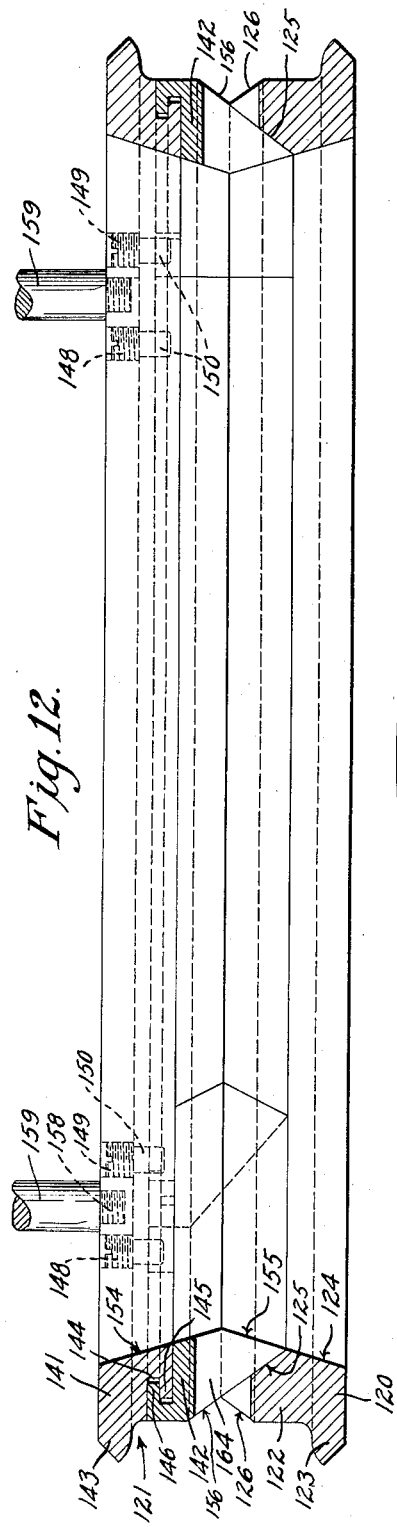
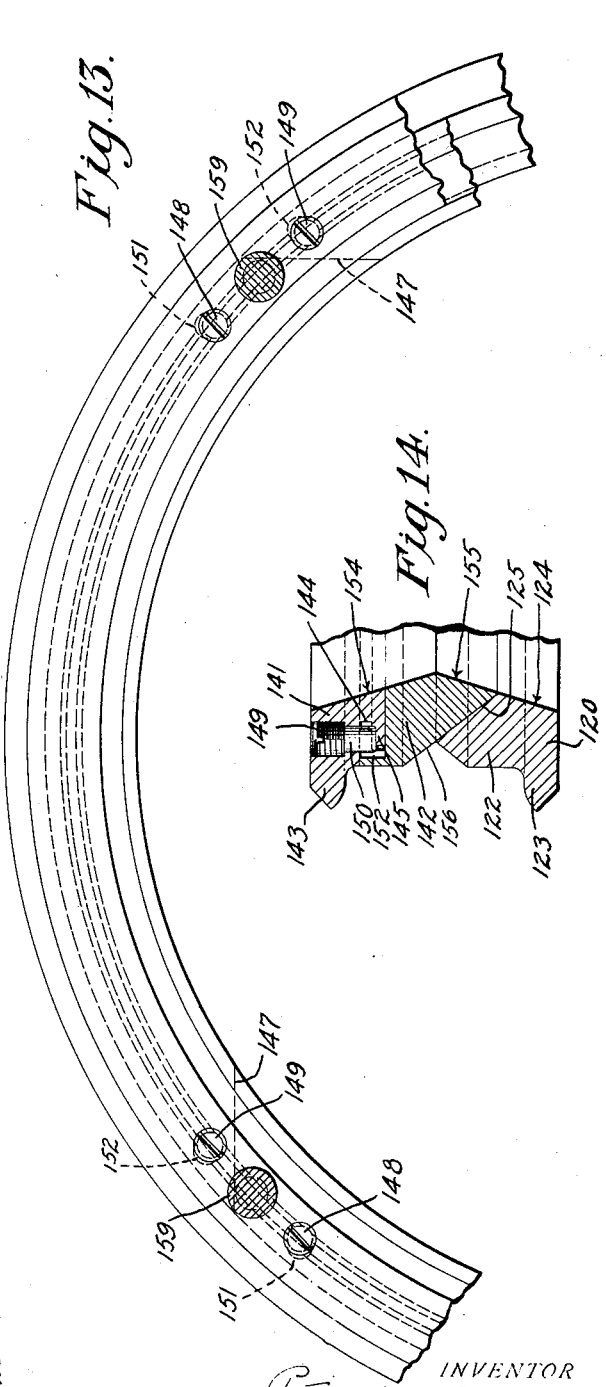
INVENTOR
Peter De Mattia
BY
Morrison Kennedy Campbell
ATTORNEYS

UNITED STATES PATENT OFFICE 1,940,582

VULCANIZING PRESS

Peter De Mattia, Passaic, N. J., assignor to National Rubber Machinery Company, Akron, Ohio, a corporation of Ohio Application January 14, 1930. Serial No. 420,667

44 Claims. (Cl. 18—17)

This invention relates to vulcanizing apparatus, and refers particularly to vulcanizing molds or presses for use in the production of pneumatic tires and similar articles.

Among the important objects of the invention are to provide a vulcanizing mold or press: with novel power mechanism for opening and closing the device; with novel means for drawing the opposed mold sections or platens tightly together in the final closing movement; with novel means for breaking the adhesion of the mold sections in the initial opening movement; with novel means to facilitate placing of the unvulcanized tire or article in the mold cavity as well as to strip it therefrom after vulcanization; and in general to provide an apparatus which will be simple in construction, strong and durable in service, and rapid and efficient in operation.

Specifically, the invention contemplates a tire vulcanizing press presenting a pair of opposed platens or holding members hingedly connected together and which are adapted detachably to support a pair of opposed annular mold sections. The mold sections are grooved in their meeting faces whereby to define between them a mold cavity within which the tire to be vulcanized is confined and subjected to heat and pressure, the heat being supplied by steam or the like circulated through jackets which surround the mold cavity, and the pressure being applied by inflating the tire (as by means of an air-bag or water-bag) within the mold cavity.

In order to swing one of the platens with reference to the other, a novel power mechanism is provided, which includes a pressure cylinder pivotally supported intermediate its ends between a pair of rock arms associated with the swinging platen and which extend rearwardly from its hinge connection. A double acting piston, operatively disposed within the cylinder, has a piston rod which extends through the lower end of the cylinder for connection with a power-multiplying mechanism for locking and unlocking the press, and this power-multiplying mechanism functions to draw the swinging platen down with great force in order to clamp the mold sections tightly together in the "lock-up" of the press as well as to break or force the mold sections apart in the initial opening of the press. The stroke of the piston is considerably less than the working length of the pressure cylinder, and the arrangement is such that in the initial opening movement, the piston moves upwardly in the cylinder and actuates the power-multiplying mechanism to unlock the press and to break the mold sections apart, whereupon the piston comes to rest and the cylinder moves downwardly on the piston and, by acting through the arms on which it is supported, swings the movable platen to its fully open position.

The press locking means acts substantially centrally through the platens so as to distribute its powerful clamping pressure uniformly over the mutually engaging annular surfaces of the mold sections, and comprises disengageable cooperating members respectively associated with the two platens. The locking member of the swinging platen is in the nature of a rugged block supported for slight arcuate movement on an adjustable eccentric shaft journaled on said swinging platen. This block extends down through the center of the swinging platen and the mold section carried thereby and is formed at its lower end with a socket for the reception of the upper end of a locking post associated with the fixed platen and which extends up through the center of said platen and the other mold section mounted thereon. The interior of said socket and the exterior of the upper end of said post are provided with buttress-shaped lugs or teeth of substantial proportions, which are alternately engaged and disengaged in the closing and opening operations respectively.

The locking post of the fixed platen is pivotally supported at its lower end on or between a pair of swinging guide arms disposed in the base of the machine, and these arms are so arranged as to carry out a substantially axial movement of the locking post at one stage in effecting the locking and unlocking of the press, and a fore-and-aft rocking movement of the upper end thereof at a different stage in effecting its engagement and disengagement with and from the depending locking block of the upper swinging platen. Such movements of the locking post are effected by the aforementioned power-multiplying mechanism, which presents a system of toggle links forming an operative connection between the locking post and the piston rod of the pressure cylinder. The upper end of the locking post is slightly tapered for engagement with a similarly formed end wall of the socket in the locking block, so that in the initial opening of the press, said post will act upon the locking block to break the mold sections apart.

Another feature of the invention is the provision of means for automatically "rimming up" the tires within the press and for facilitating the insertion and removal of the tires. For this purpose, each of the mold sections is equipped with a ring member which is adapted to be seated in an appropriate groove in the meeting face of the corresponding mold section, each ring member comprising a cylindrical portion and an annular flange portion for engaging the corresponding bead of the tire. The cylindrical portions of the ring members have their meeting edges formed with cooperating bevels so as to render the ring members self-alining, and each ring member is mounted for limited movement axially with reference to the mold section with which it is associated. As the press is opened, the ring member of the fixed mold section is moved out of its seat, through the medium of certain links and levers connected with the pressure cylinder, and thus the tire is stripped automatically from the fixed mold section; and at the same time, the ring member of the upper or swinging mold section is left free to drop by gravity out of its seat. The lower ring member is continuous, whereas the upper ring is made up of a plurality of segments which render it automatically contractible and expansible.

The foregoing and other objects, features, and advantages of the invention will be readily understood from the following description in connection with the accompanying drawings, wherein the invention has been shown by way of illustration, and wherein Fig. 1 is a side elevation, partly in section, of one form of vulcanizing press embodying the invention, and showing the press closed and locked;

Fig. 4 is a top plan view of the press;

Fig. 5 is a face view of the lower mold section, and a transverse section through the locking mechanism, taken on line 5—5 of Fig. 1;

Fig. 12 is a vertical transverse sectional view of the tire-supporting ring members, the section being taken on line 12—12 of Fig. 10;

Fig. 13 is a fragmentary plan view of said ring members; and

Fig. 14 is a detail sectional view taken on line 14—14 of Fig. 13.

Figure 1:
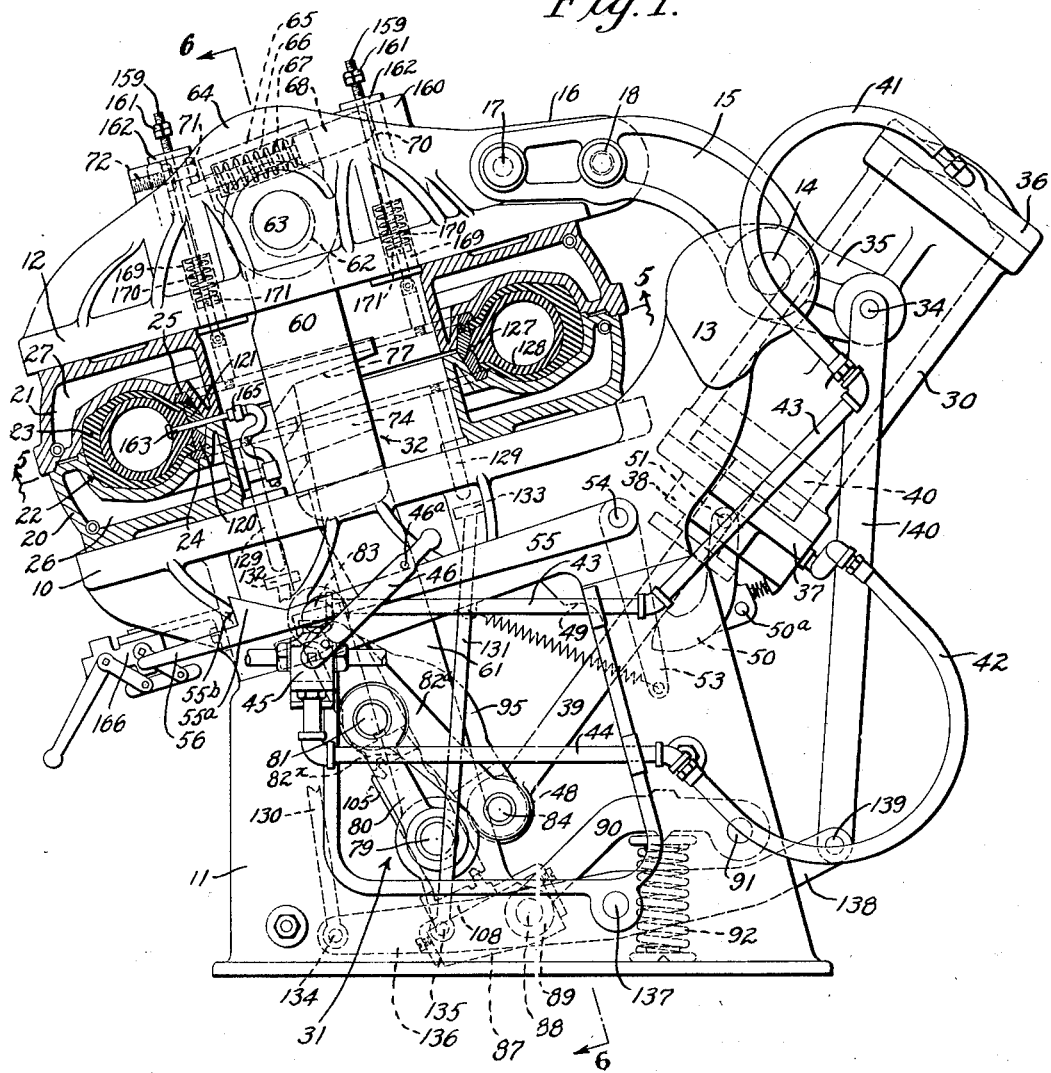

As best shown in Figs. 1 to 6 inclusive, the improved vulcanizing press comprises a lower fixed platen or bed 10, supported by a suitable pedestal or base 11, and an upper swinging platen or bed 12. The lower platen or bed 10 is provided at the rear with a pair of spaced-apart knuckles or arms 13, the upper ends of which are bifurcated and apertured for the reception of axially alined hinge pins or shafts 14 (Fig. 4). The upper swinging platen 12 is likewise provided with a pair of spaced-apart arms 15 which enter the bifurcated ends of the arms 13 and are pivotally supported therein by the hinge pins or shafts 14. The hinge arms 15, instead of being integral with the swinging platen 12 (as they might be) are made separate therefrom and are secured to suitable ribs 16 on the upper side of said platen by means of bolts 17 and 18, the bolts 17 having a fairly snug fit in said arms and ribs, while the bolts 18 have a comparatively loose fit in the arms as indicated at 19 in Fig. 4. This arrangement allows a slight freedom of movement or play of the upper platen 12 in a direction parallel to its axis in the closing and opening of the press, so as to facilitate the seating and unseating of the mold sections as will hereinafter be explained.

Secured to the respective platens 10 and 12, as by cap screws or the like not shown, is a pair of opposed annular mold sections 20 and 21, the meeting faces of which are grooved to provide an annular mold cavity 22, within which a tire 23 is adapted to be confined during vulcanization. Adjacent the inner periphery of the mold cavity 22, the mold sections 20 and 21 are respectively formed with annular recesses 24 and 25 for the reception of bead-confining rings which, as will later be explained, facilitate the insertion and removal of the tires. The mold sections are individually heated by the circulation of steam or other heating fluid through heating chambers or jackets 26 and 27, such steam being supplied and drained through suitable piping not shown in the drawings. By thus providing the mold sections directly with heating jackets, a better and more uniform cure is obtained, and this is especially advantageous when molds of different sizes are to be used interchangeably in the press. If desired, however, the heating chambers may be formed directly and permanently in the press platens.

In order to swing the upper platen 12 and its associated parts to open and closed positions, there is employed a pressure cylinder 30, which is provided at its opposite sides, and intermediate its ends, with bosses 33 (Fig. 4) bored to accommodate pins or trunnions 34 which support the cylinder pivotally between the extensions 35 of the hinge arms 15 for the swinging platen. Due to the fact that the extensions 35 are disposed rearwardly of the hinge pins 14, the cylinder 30 and its associated parts serve, at least partly, to counterbalance the weight of the upper swinging platen. Head members 36 and 37 serve as closures for the opposite ends of the cylinder 30, the head member 37 having a stuffing box 38 through which a piston rod 39 is slidable. A double acting piston 40 is secured to the inner end of the piston rod 39 to operate within the cylinder, while the lower end of the piston rod is connected to a power-multiplying mechanism 31, as will later be explained.

Fluid, such as water, under pressure is admitted to and exhausted from the opposite ends of the cylinder 30 through flexible conduits 41 and 42 and pipes 43 and 44, under the control of a four-way cock or other suitable valve 45, which is manually operated by means of a handle 46.

Figure 3:
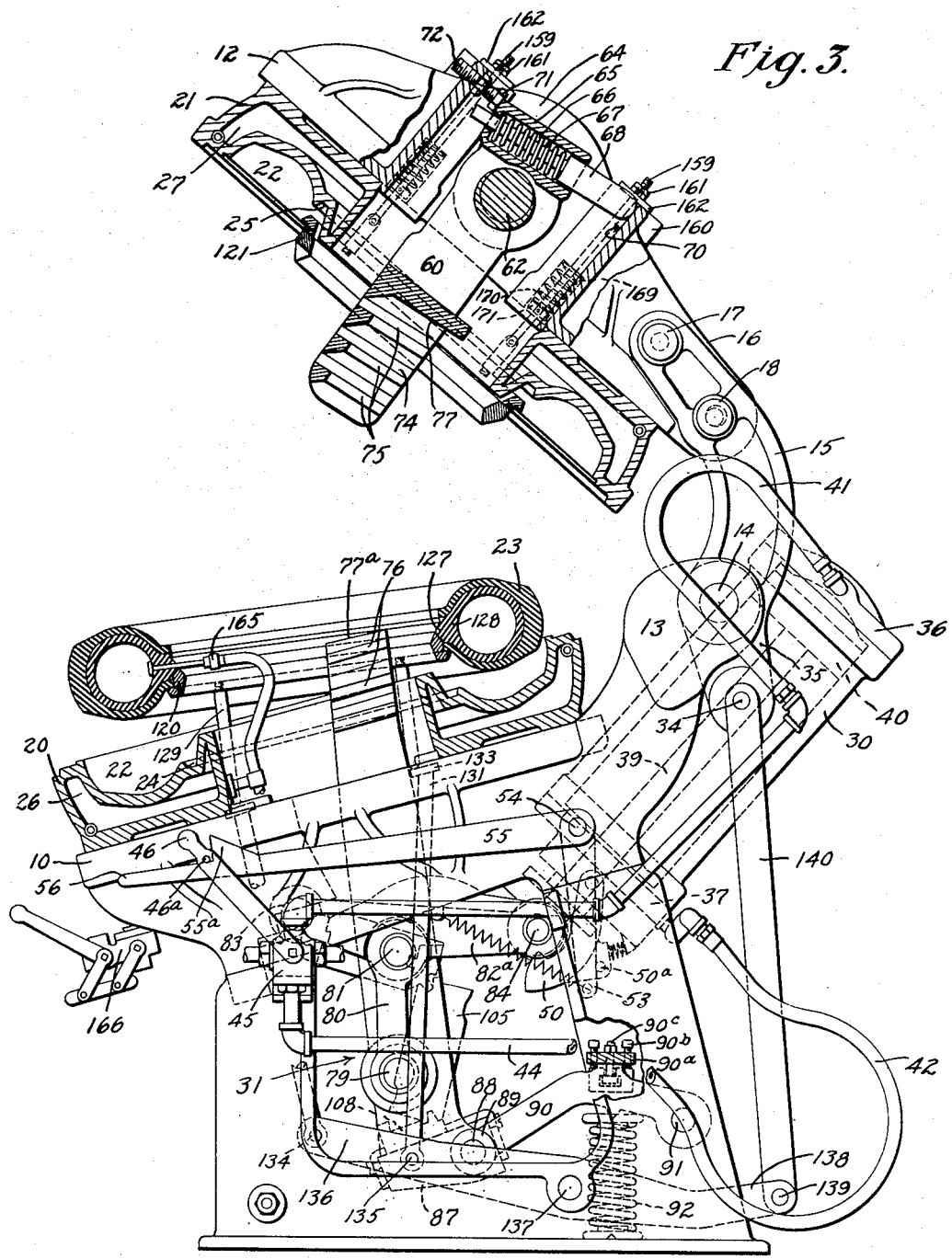
Fig. 3 is another view similar to Fig. 1, but showing the parts in fully open position.
Figure 7:
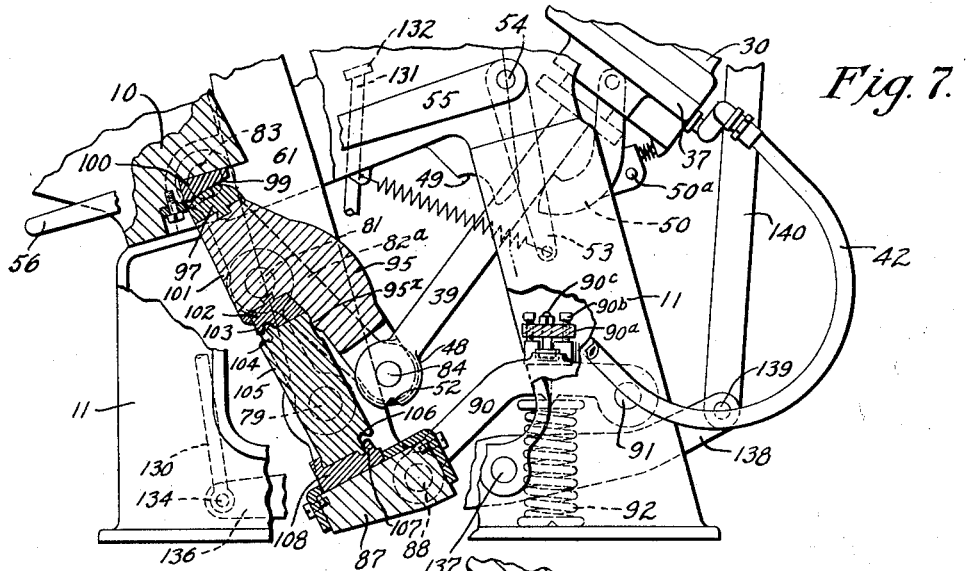
Fig. 7 is a fragmentary vertical longitudinal sectional view through the power-multiplying toggle mechanism, with the parts in the same relation as in Fig. 1.
Figure 8:
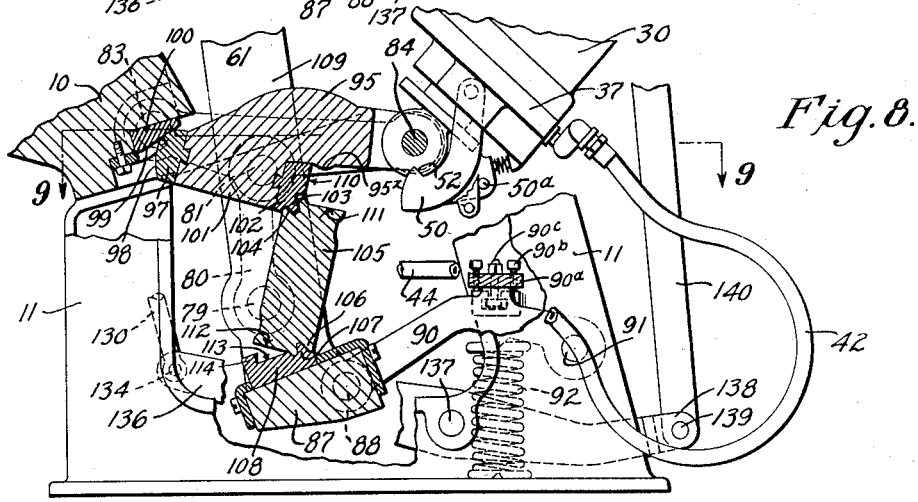
Fig. 8 is a similar sectional view with the parts in the same relation as in Fig. 3.
Figure 9:
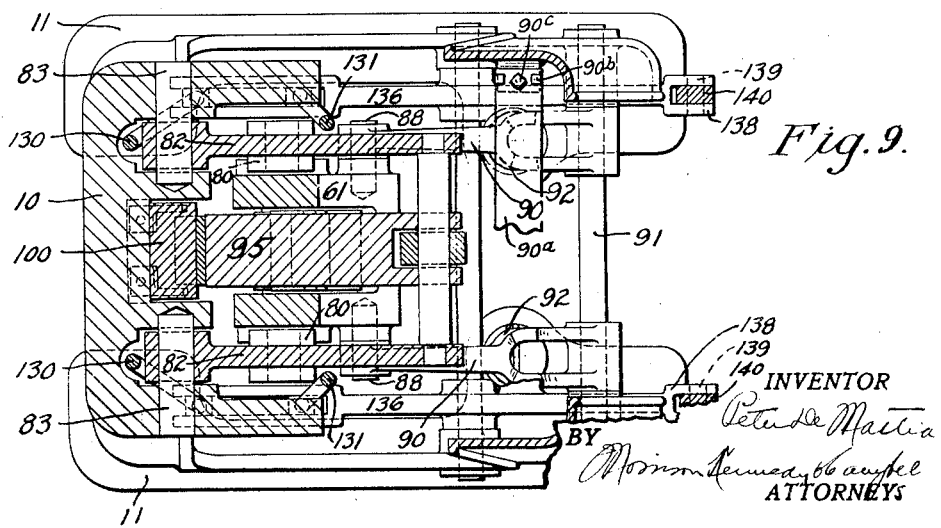
Fig. 9 is a substantially horizontal sectional view taken on line 9—9 of Fig. 8.
Figure 10:
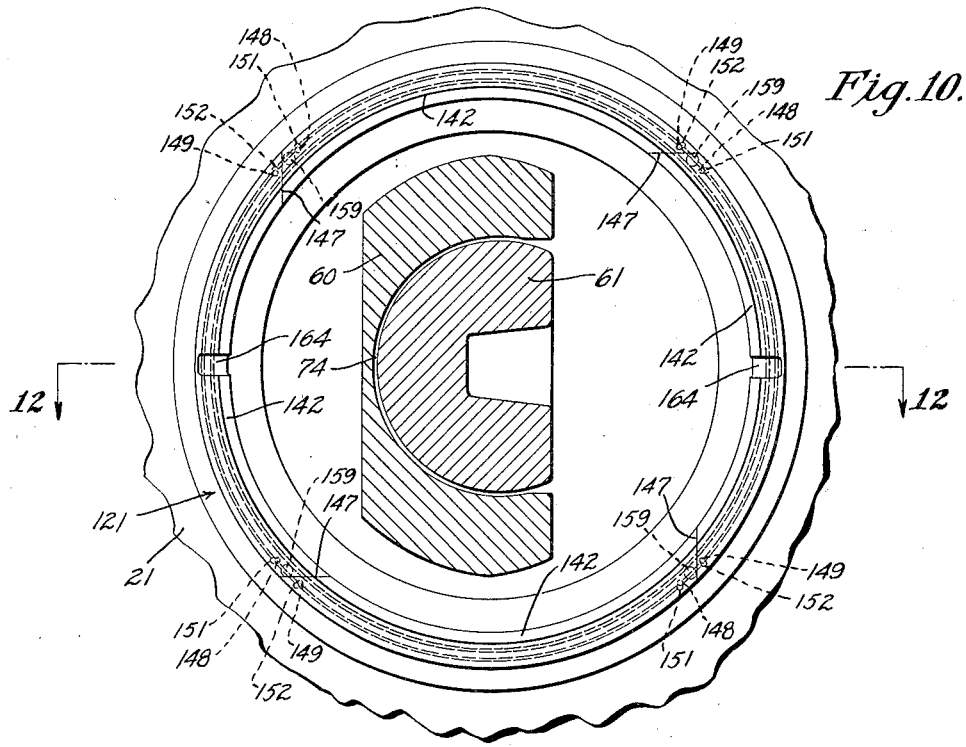
Fig. 10 is a fragmentary view similar to Fig. 5, but on a larger scale, showing the locking block and post in engagement.
Figure 11:
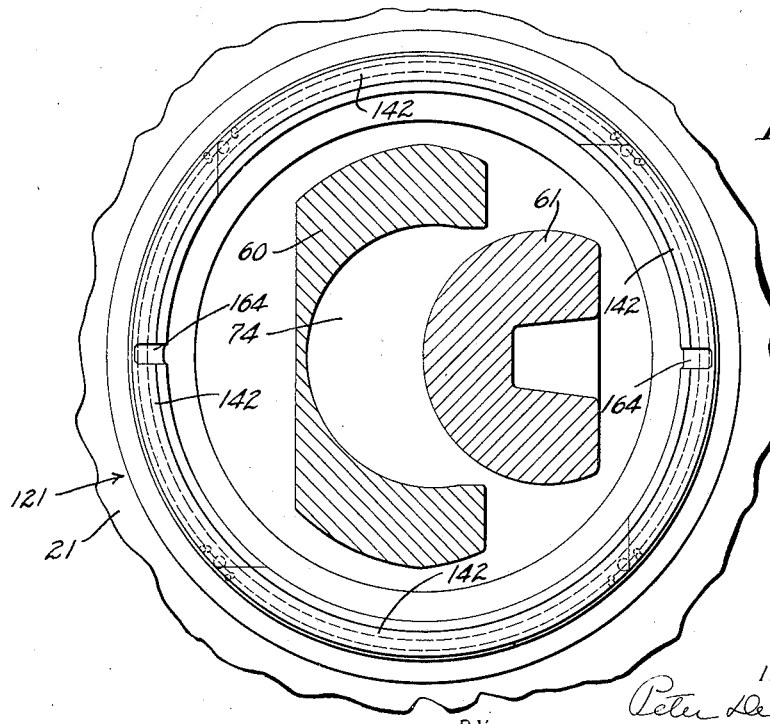
Fig. 11 is a view similar to Fig. 10, but with the locking block and post disengaged.

In its upward movement, the piston 40 is limited to a stroke less than the working length of the cylinder, by the abutment of the lower end 48 of the piston rod against a fixed stop 49 in its path (see Fig. 1), and after the piston is thus arrested, continued pressure in the lower end of the cylinder causes the cylinder itself to move bodily downward on the piston, thereby swinging the upper platen 12 and its associated parts to fully open position as shown in Fig. 3. As the cylinder 30 reaches the downward limit of its movement, the free end of a dog 50, which is pivotally supported at 51 on the cylinder head 37, slides under and engages a suitable shoulder 52 on the lower end 48 of the piston rod (Figs. 7 and 8), whereby to lock the piston and cylinder in these positions and thus to prevent closing of the press in the event that the pressure behind the piston should be reduced or let out for any reason.

Before the press can again be closed, it is necessary to disengage the locking dog 50 from the shoulder 52, and this is accomplished by means of an arm 53 fast to a shaft 54 rotatable in the base of the fixed platen 10, and which is adapted to be rocked by means of a forwardly extending lever 55 at one side of the press, said lever 55 having a handle portion 56 convenient to the operator's station at the front of the machine. As the arm 53 rocks rearwardly, its rear edge engages and pushes against a pin or lug 50$^a$ which extends outwardly from the side of the dog 50.

Preferably, the operation of the lever 55 and the actuation of the valve 45 are coordinated in such manner as to require the use of both hands of the operator in effecting or initiating the closing movement of the upper platen. To this end, the valve handle 46 and the forwardly extending lever 55 are arranged in side-by-side relation, and the handle 46 is provided with a laterally projecting pin 46$^a$ which extends over the lever 55. The lever 55 has a triangular stop member 55$^a$ disposed in the path of movement of the pin 46$^a$ and presenting an abrupt shoulder portion 55$^b$ which engages said pin 46$^a$ and normally prevents rearward movement of the valve handle 46 when the press is opened (see Fig. 2). When the lever 55 is moved downwardly, however, to disengage the dog 50 from the shoulder 52, the stop member 55$^a$ is moved out of the way of the pin 46$^a$ (see Fig. 1), leaving the handle 46 free to be swung rearwardly to release the pressure from the lower end of the cylinder and to admit pressure to the upper end thereof. By thus requiring the operator to use both of his hands in closing the press, it is impossible for him accidentally to have either of his hands caught and crushed between the mold sections as the press is closed.

The two platens are locked in closed relation by clamping means 32 arranged to act substantially centrally of the platens so as to distribute its powerful clamping pressure uniformly over the entire engaging surfaces of the mold sections. Such clamping means comprises a locking block 60 associated with the swinging platen 12, and a cooperating locking post 61 associated with the fixed platen 10, said block and post being adapted to be engaged and disengaged alternately, and when engaged constituting, in effect, a continuous link acting to draw the upper platen 12 downwardly toward the lower platen 10. The block 60, which extends downwardly through the center of the upper platen 12 and the mold section 21, is adjustably secured at its upper end to an eccentric portion 62 of a shaft 63 journaled at its opposite ends in longitudinal webs 64 on the upper side of said platen 12 (see particularly Fig. 6). Due to the adjustable eccentric connection between the block 60 and the supporting shaft 63, the block may be set at different effective heights in varying the clamping pressure on the mold sections.

In order that the block 60 may have a slight but limited rotation upon the shaft 62, it is formed at its extreme upper end with a boss 65, having a fore-and-aft recess or socket 66 containing a compression spring 67. One end of said compression spring bears against the bottom of the recess 66, while its other end presses rearwardly against the inner end of a plunger 68. At its outer end, which is rounded as indicated at 69, the plunger 68 makes sliding contact with a stop surface 70 at the upper side of the platen. The plunger 68 and spring 66 thus act to swing the block 60 in a counterclockwise direction, as viewed in Fig. 1, and such movement is limited by the abutment of the forward end of the boss 65 against the head 71 of an adjustable stop screw 72. The purpose of this limited movement of the block 60 is to facilitate its connection and disconnection with and from the locking post 61, these parts (as will immediately appear) being formed with relatively long teeth which are caused engage and disengage by a compound movement of the locking post. In other words, due to the yieldable mounting of the block 60, it automatically adapts itself to the post 61, such that their teeth may cooperate in a smooth and easy fashion.

Figure 6:
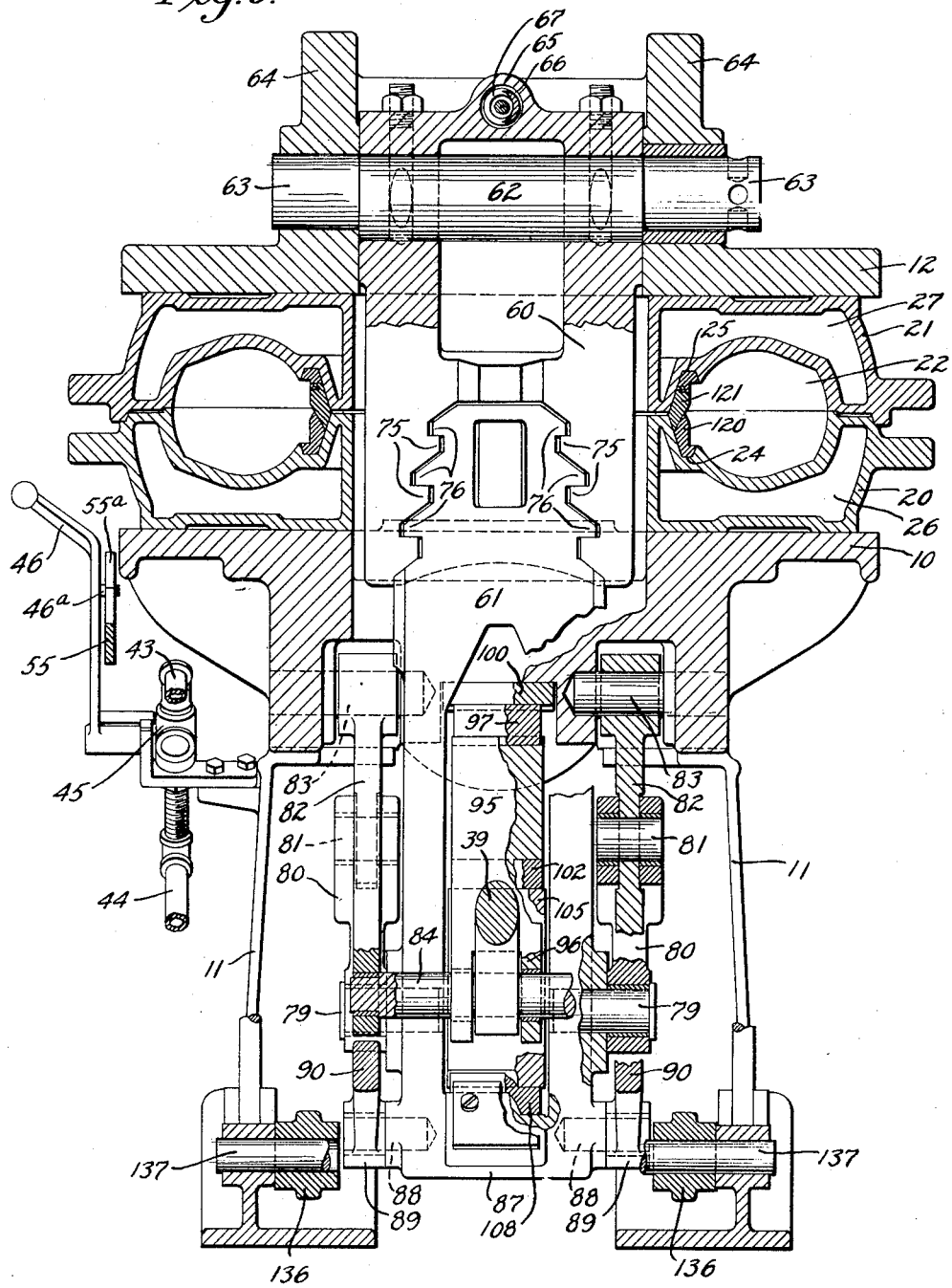
Fig. 6 is a vertical transverse sectional view taken approximately on line 6—6 of Fig. 1, with some parts broken away.

At its rearward side and at its lower end the block 60 is formed with a groove or socket 74, the walls of which, as best shown in Fig. 6, are formed with a series of buttress-shaped lugs 75 having relatively flat upper surfaces. Instead of being in vertical alinement, the lugs 75 are preferably arranged in upwardly converging steps or series for the purpose of more satisfactorily distributing the stresses through the material of the block.

Referring now to the post 61, it is likewise formed (at its upper end) with a stepped series of buttress-shaped but reversely disposed lugs 76 to cooperate with the lugs 75 of the block 60, the engagement and disengagement of these lugs being brought about by the fore-and-aft swinging of the upper end of the post 61. It may here be noted that the upper or inner end of the socket 74 of the block 60 is preferably formed with a slight taper, as at 77, and is adapted to be engaged by the upper end of the post 61 which is correspondingly tapered as at 77$^a$, these contacting surfaces enabling the post 61, by a slight upward movement, to force the mold sections apart, in the initial opening of the press.

Adjacent its lower end, the locking post 61 is pivotally connected at 79 to the lower end of a pair of toggle links 80 which form a part of the power-multiplying mechanism 31 before alluded to, and which not only support the post 61 but cooperate in moving the same into and out of engagement with the block 60. The toggle links 80 are arranged at opposite sides of the post 61 (see Fig. 6) and have their upper ends pivotally connected at 81 to a second pair of toggle links 82, which in turn are pivoted at 83 to the lower fixed platen 10. The upper toggle links 82 are formed with integral arms 82$^a$ which extend rearwardly and downwardly for some distance below the break joint 81 of the toggle system and which are pivotally connected at their lower free ends, by means of a pin or rod 84, with the lower end 48 of the piston rod 39. According to this arrangement, as the piston rod moves upwardly, it will swing the links 82 about their fulcrums 83 in a counterclockwise direction (thereby breaking the toggle joint), until the movement of the piston is arrested by the stop 49 in the manner before described, at which time the links 82 will stand in a substantially horizontal position, as shown in Fig. 3. In thus swinging upwardly, the links 82 act through the other set of links 80 first to draw the locking post 61 upwardly while still engaged with the block 60 so as to break the mold sections apart, and then later (as will next be explained) to swing the upper end of the post rearwardly to break its engagement completely with the block 60.

In order to guide and direct the locking post 61 in its compound movement, it is formed with an enlarged base portion 87 which is pivotally connected by pins or shafts 88 to the free ends 89 of a pair of vertically movable swinging arms 90. These arms 90 are arranged within the base portion 11 of the press, one at each side, and are pivotally mounted as at 91 in said base portion. Coiled compression springs 92 are placed below the swinging guide arms 90 for the purpose of yieldingly supporting or maintaining the locking post 61 and connected parts in their raised condition and preventing the post from dropping too rapidly in the closing of the press.

It is to be noted, however, that the upward swinging movement of the arms 90 is limited by their abutment against a stop bar 90$^a$ before the piston 40 has reached its upward limit of movement as defined by the stop 49. As a result, the pins 88 become fixed fulcrums about which the locking post 61 is swung to disengage its teeth from those of the locking block 60 in the final upward movement of the toggles. The stop bar 90$^a$ (Figs. 3, 7, 8, and 9) extends transversely in the base of the machine, between the leg members 11, and is adjustably supported therein by set screws 90$^b$ and bolts 90$^c$ in cooperation with suitable lugs which are cast on the inner sides of the leg members.

As will now be understood, the arms 90 will guide the upward movement of the post 61 under the action of the toggle system, and they will, because of their pivotal connection with the post at a point (88) below that (79) at which the toggle system is pivoted thereto, cause the upper end of the post in its upward movement to swing rearwardly after the arms 90 have been arrested by the stop bar 90$^a$, and conversely, cause the post in its downward movement to swing forwardly at its upper end. It is in this way that the post 61 is automatically engaged with and disengaged from the depending block 60 in the closing and opening movements of the upper platen, it being remembered that the pivotal yielding mounting of the block 60 on said upper platen facilitates its cooperation with the post 61. The guide arms 90 thus act in conjunction with the toggle system to insure the proper movements of the locking post at all times. After the post 61 is moved upwardly by the toggle links 80, it will be moved bodily rearward by virtue of the fact that the pivotal connection at 88 becomes a fixed fulcrum, but of course the disengagement of the post from the locking block 60 is not effected immediately. It is for this reason that the tapered surfaces 77 and 77$^a$ are provided on these members, these surfaces maintaining contact until after the post has been raised sufficiently to break the mold sections apart by the upward thrust of the locking post.

The purpose in making and breaking connection between the locking block 60 and locking post 61 is two-fold. Firstly, since the link connection formed by the engagement of these parts passes centrally thru the press for the reasons already explained, the breaking of the connection is necessary to permit the insertion and removal of the tires in and from the mold sections. Secondly, since said link connection is operative only during the initial opening and the final closing movements of the press, the breaking of the connection enables the two parts to be made relatively short and avoids the necessity for a toggle system with an excessive throw. There are other factors involved, but the two points mentioned will serve to emphasize the value and advantage of the present construction.

While the toggle links 80 and 82 are intended primarily to perform the functions and operations above described, it will be clear that they will also act to clamp the mold sections tightly together when they are straightened out as shown in Fig. 1. That is to say, before the mold sections are brought together and before the toggles are straightened out in the closing of the press, the locking post 61 becomes engaged with the locking block 60 (see Fig. 2) and, once these parts are engaged, the toggles act immediately to draw the mold sections toward each other with a true toggle action, exerting a powerful clamping pressure on the mold sections as the links are finally straightened out. In actual practice, the toggle links do not need to pass "dead center" or even to reach it, as a slight displacement will not materially affect the clamping pressure. In this respect it may be noted that overthrow of the outside toggles is prevented, in the illustrated embodiment, by a binding engagement of the arms 82$^a$ against the rear edges of the links 82 as indicated at 82$^x$ in Fig. 1, as well as by the abutment of the pin 84 with the rear side of the post 61. As an additional precaution, the arm 95 of the inside toggle 101 is formed with a protruding portion 95$^x$ (Fig. 7) which is adapted to bear against the rear edge of the block 105.

Notwithstanding the great clamping pressure which the toggle links 80 and 82 are capable of exerting, it is proposed to provide a second toggle system for drawing the platens together in the final lock-up of the press. This second toggle system, as will be seen, is far more massive and rugged than the other and is mainly relied upon to develop the high clamping pressure which is needed in holding the mold sections in tight contact during vulcanization. To convey some idea of the pressures being discussed, it may be stated that the present press is capable of giving a 150-ton pressure between the platens with a cylinder pressure of only 300 lbs. to the square inch. The second toggle system, like the first, acts upon the platens through the locking post 61 and, for this reason, the two systems are arranged for synchronous operation, acting together in applying the clamping pressure to the platens but the first system acting alone in separating the platens, as intended.

Referring now in detail to the second toggle system (best shown in Figs. 7, 8 and 9) it comprises a pair of toggle links in the nature of solid blocks, an upper one 101 corresponding to the toggle links 82 of the first system and, like the links 82, having an integral operating arm 95 corresponding to the arm 82$^a$, and a lower one 105 corresponding to the toggle links 80. The arm 95 is bifurcated at its free end 96 to straddle the lower end 48 of the piston rod, to which it is pivoted by means of the same pin 84 which connects the piston rod to the arms 82$^a$ of the toggle links 82. The toggle block 101 is formed at its upper end with a wear plate 97 having a rounded face 98 which bears against and makes rolling and sliding contact with the lower surface 99 of a fixed pressure plate 100 mounted on the platen 10, the mounting being such that the toggle block will rock about an axis substantially in line with the pivotal axis 83 of the toggle links 82. At its lower end, and near the axis 81 of the links 80 and 82, the block 101 is fitted with a pressure block 102 having a gear tooth 103 engaged between a pair of gear teeth 104 formed on the lower toggle block 105 at its upper end and adjacent its front corner. At its lower end, but adjacent its rear corner, the toggle block 105 is also formed with gear teeth 106 mating (near the pivotal connection 79 of the toggle links 80 with the post 61) with a fragmentary gear formation 107 on a wear block 108 secured to the upper side of the base portion 87 of the locking post 61. As clearly shown in the drawings, the lower end of the locking post 61 is bifurcated as at 109, so that the toggle blocks 101 and 105 can operate within said bifurcated portion. As before stated, the toggle links 80 and 82 are disposed at the outer sides of the locking post.

From the foregoing, it will be clear that the toggle blocks 101 and 105 are loosely supported at the lower end of the locking post 61, the end 97 of the block 101 having rolling and sliding engagement with the fixed surface 99, and the block 105 being held against displacement by the engagement of the gear teeth 103, 104, and 106, 107. As pressure is admitted to the upper end of the cylinder 30, and the dog 50 swung to unlocking position, the cylinder will first move upwardly, swinging the platen 12 down toward the fixed platen 10, and subsequently the piston 40 and rod 39 will move downwardly. As the piston rod 39 thus descends, it will straighten out the first toggle system as shown in Fig. 1, swinging the upper end of the post 61 forwardly into the socket 74 and drawing the same axially downward in the manner before described. The same downward movement of the piston rod 39 will simultaneously straighten out the second toggle system as also shown in Fig. 1, creating a great pressure between the fixed pressure plate 99 and the base plate 108 of the post 61.

Beside the gear teeth 103, the wear block 102 has a relatively flat surface 110 (Fig. 7) which is adapted to be engaged by a slightly convex upper surface 111 of the block 105 when the toggle approaches dead center. It is this very slight bulge of the surface 111 which effects the final powerful clamping action by taking up any looseness or play in the toggle links 80 and levers 82. To prevent overthrow of the toggles, the lower end 112 of the block 105 is flattened and adapted to seat upon a similarly formed upper side 113 of the bottom wear block 108, which also has, at its front edge, a shoulder portion 114 to assist in maintaining the block 105 against dislodgment.

It will now be seen that the second toggle system, composed of the loosely jointed blocks 101 and 105, will serve only to exert a clamping pressure between the platens in the closed condition of the press, the first toggle system alone being active in opening the press. It has been found that the loose mounting of the toggle blocks 101 and 105 is particularly effective in producing the maximum clamping pressure desired, there being no lost motion at the joints and little or no turning friction generated when the toggles are exerting heavy pressure in clamping the mold sections together. The adjustable mounting of the locking block 60 on the upper platen, as before stated, enables the clamping pressure to be varied as desired, the adjustment serving in effect to lengthen or shorten the link connection between the toggle systems and the upper platen.

Ordinarily, the tires are mounted upon steel rings before being placed in the molds, such rings serving to confine the beads of the tire and to support the base of the inflating bag. While the press above described may be used for vulcanizing previously rimmed tires, I prefer to employ mechanism for automatically rimming the tires within the press, thus doing away with this separate operation, and incidentally I also make use of this mechanism for stripping the vulcanized tires from the mold cavities as the press is opened. Such mechanism, as best shown in Figs. 1 to 3 and 10 to 14, comprises essentially a solid annular ring member 120 associated with the lower fixed mold section 20, and an expansible and contractible ring member 121 associated with the upper swinging mold section 21.

The lower ring member 120 presents a substantially cylindrical body portion 122 having at its lower side and on its outer periphery an annular flange 123 which is adapted to receive and support the lower bead portion of the tire 23, and said flange together with the adjacent portion of the body 122 are adapted to seat in the annular groove 24 of the lower mold section 20. Adjacent its lower side, the ring member 120 is tapered or cone-shaped on its inner periphery as indicated at 124, to correspond with the base wall of the mold cavity; while at its upper side, and on its inner periphery, the ring member is tapered or cone-shaped in a reverse direction, as indicated at 125, to receive the entering side of the upper ring member 121. Also, at its upper side but on its outer periphery, the ring member 120 is beveled or chamfered, as at 126, to facilitate placing of the lower bead of a tire on the cylindrical surface of the ring body 122 and against the upper side of the flange 123.

A plurality of vertically movable rods 129, preferably four in number and spaced substantially equidistantly about the periphery of the ring member 120, have their upper ends secured to said ring member and depend through suitable openings in the mold section 20 and platen 10 for the purpose of moving the ring member 120 axially into and out of the groove 24. At their lower ends, the rods 129 rest upon a similar number of suitably guided push rods, two 130 at the front and two 131 at the back and having enlarged heads 132 and 133 respectively for engaging the lower ends of said rods 129. At their lower ends, the rods 130 and 131 are pivotally attached, as at 134 and 135, to the forward ends of a pair of levers 136, arranged at opposite sides within the base member 11 of the machine, and which are pivotally supported therein at 137. The levers 136 are provided with rearwardly extending portions 138 which are pivotally connected at 139 to the lower ends of upright links 140 whose upper ends are connected at 34 to the swinging arms 35 of the top platen 12.

The foregoing arrangement is such that, as the cylinder 30 moves downwardly to open the press; the links 140 will act upon the levers 136 to raise them at the forward ends and cause the push rods 130 and 131 to lift the rods 139 and force the ring member 120 upwardly out of its seat in the groove 24. In thus moving upwardly, the ring member 120, by reason of the engagement of its annular flange portion 123 with the lower bead portion of the tire, will strip the tire from the mold cavity and position it above and out of contact with the walls of the mold cavity (see Fig. 3). 150

The upper ring member 121 is composed of a number of sections, including an upper cylindrical body portion 141 and a plurality (preferably four) of lower segments 142. At its upper side, the body portion 141 is provided on its outer periphery with an annular flange 143 similar to the flange 123, but adapted to engage against the upper bead of the tire and hold the same in properly spaced relation to the lower bead. Adjacent its lower side, the body portion 141 is provided with an annular groove 144 and a flanged portion 145 which function to support the segments 142. As best shown in Figs. 12 and 14, each of the segments 142 is formed with an inwardly extending annular flange 146 for disposition within the annular groove 144, and the body portions of said segments extend inwardly and underlie the annular flange portion 145 of the member 141. The meeting ends of the adjacent segments 142 are beveled off substantially as indicated at 147 in Fig. 13, and adjacent said ends the segments are attached to the body portion 141 by means of screws or dowel pins 148 and 149.

The screws 148 and 149 are anchored in the body portion 141 of the ring member and are formed with cylindrical ends 150 of reduced diameter which extend through the annular groove 144 and through the flange portions 146 of the respective segments 142. The lower ends 150 of the screws 148 and 149 are loosely received in slots 151 and 152 of each segment 142, so that all the segments will be capable of slight limited movement with reference to the body portion 141 of the ring member. As best shown in Fig. 13, the slot 151 extends in a direction substantially parallel to the adjacent end 147 of the corresponding segment, whereas the slot 152 extends in a substantially radial direction. By virtue of this arrangement, the segments 142 will be capable of movement such as to expand and contract as the ring member is moved into and out of its seat 25 in the upper mold section 21.

The inner periphery of the body portion 141, as well as the upper portions of the inner peripheries of the segments 142, are tapered or cone-shaped as indicated at 154 to correspond with the base wall of the mold section 21, whereas the lower portions of the inner peripheries of the segments 142 are reversely tapered or cone-shaped, as indicated at 155, so as to conform to the base wall of the lower mold section, within which said inner ends of the segments 142 are adapted to enter. Adjacent the lower side of the ring member, the outer peripheries of the segments 142 are chamfered, as indicated at 156, so as to permit the ring member easily to enter the upper bead of the tire and to seat snugly within the tapered or cone-shaped upper side 125 of the other ring member 122. From this it will be apparent that the engagement of the segments 142 within the cone-shaped portion 125 of the ring member 120 and against the base walls of the mold sections 20 and 21 will accurately determine the diameter of the entire series of segments during the vulcanizing operation.

The body portion 141 of the ring member 121 is secured to the threaded lower ends 158 of four equally spaced-apart suspension rods 159, which extend through suitable openings in the mold section 21 and platen 12, and the upper ends of which project through suitable bosses 160 on the upper side of said swinging platen 12 (Fig. 4). The upper ends of the suspension rods 159 are screw threaded and fitted with adjustable stop nuts 161 which, when the press is closed as shown in Fig. 1, are spaced above suitable washers 162 on the upper ends of said bosses 160. The lower ends of the holes, through which the suspension rods 159 slide in the upper platen 12, are counterbored as at 169 to receive compression springs 170, the upper ends of which bear against the bottoms of the counterbores, while their lower ends bear against collars 171 which are secured to the rods 159. As the press is opened, the springs 170 act to force the ring 121 out of its seat in the groove 25, and thus maintain the ring 121 in engaging relation with the ring 121 and with the tire until the press has opened sufficiently to cause abutment of the stop washers 162 with the stop nuts 161. In this initial opening movement, the vulcanized tire is positively stripped from the upper half of the mold cavity, and thereafter the ring 121 is carried bodily upward with the swinging platen.

When the press stands open, as in Fig. 3, the operator places a tire 23, having an inflating bag 128 within it, upon the ring member 120, the lower bead of the tire being able to be seated easily by virtue of the conical surface 126 of said ring. Then as the press is closed, the lower beveled sides 156 of the segments 142 enter the upper bead of the tire, and in engaging the bead, said segments are moved slightly inward in a general radial direction so that the cylindrical portions of the segments enter and engage the base of the bead. As the closing movement continues, the mold section 21 follows the ring member 121 toward the tire so that said ring member becomes seated in its groove 25 against the pressure of the springs 170, and in this final closing movement, the cone-shaped base wall of the mold section 21 acts upon the tapered inner surfaces 154 of the segments to expand the same against the inner periphery of said upper bead of the tire.

The water bag 128 has its inner periphery formed with a circumferential V-shaped rib, corresponding to the conical surfaces 126 and 156 of the ring members, and is provided with one or more inflation valve stems 163, for the accommodation of which the upper side of the ring member 122 and the lower sides of one or more of the segments 142 are notched, as indicated at 164 in Fig. 12. This inflation valve stem, as usual, is adapted to be connected by means of a suitable coupling 165 to a pressure fluid circulation pipe (not shown), whereby the inflating medium, such as hot water, steam or the like, may be circulated through the interior of the inflatable former under the control of a manually operated valve 166 adjacent the front of the press.

The operation of the improved vulcanizing press is as follows:

When the press stands open, the upper platen 12 and its associated parts occupy the position shown in Fig. 3, with the piston 40 at the upper end of the cylinder 30 and held in such position by engagement of the locking dog 50 with the shoulder 52 on the lower end 48 of the piston rod 39. The toggle links 82 and 101 are substantially horizontal, and the locking post 61 has its upper end disposed at one side of the center of the fixed mold section 20. The lower tire-supporting ring 120 is supported out of its seating groove 24 in the lower mold section 20 by virtue of the engagement of the lower ends of the rods 129 with the upper ends of the push rods 130 and 131, which have been raised by the upward movement of the forward ends of the pivoted levers 136. In this open condition of the press, the attendant or operator places an unvulcanized tire 23, which has a water-bag 128 arranged within it, upon the ring member 120 with its lower bead resting against the annular flange 123. He then connects the inflating valve stem 163 to the pressure supply line by means of the coupling 165, so that the pressure can be applied to the interior of the bag 128 when the press is closed.

Figure 2:
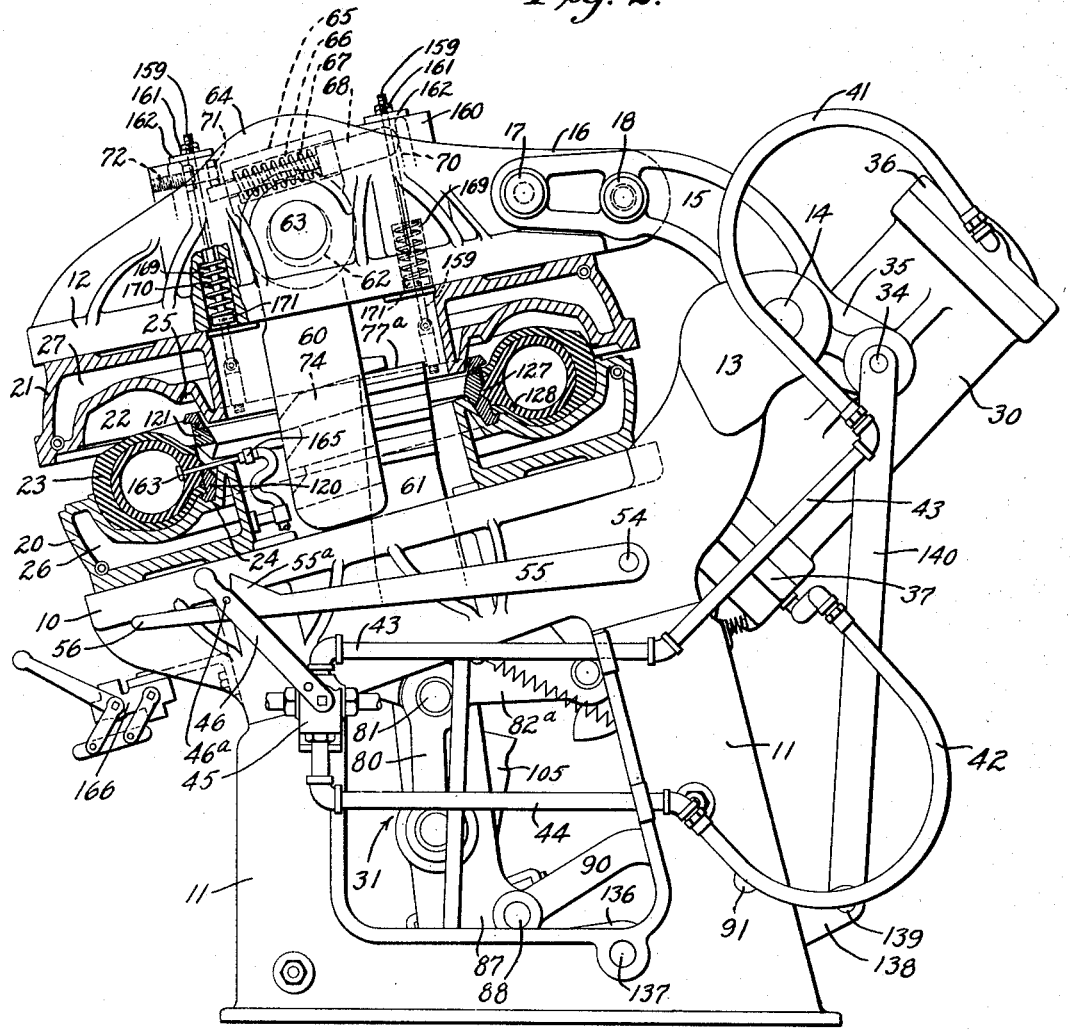
Fig. 2 is a similar view showing the press unlocked and broken open.

The operator then depresses the handle portion 56 of the lever 55, so as to disengage the dog 50 from the shoulder 52, and while holding said lever 55 in its downward position, he pushes the valve handle 56 rearwardly through an arc of substantially 90°, so as to actuate the valve 45 to admit pressure to the upper end of the cylinder 30 and to open the lower end of said cylinder to the exhaust line. As a result, the cylinder 30 moves bodily upward and acts through the arms 35 and 15 to swing the upper platen 12 downwardly about the axis of the hinge pins 14 to a position substantially as shown in Fig. 2. When the cylinder comes to rest, the piston 40 commences to move downwardly under the influence of the same pressure in the upper end of the cylinder, and acts through the piston rod 39 to swing the toggle arms 82ª and 95 downwardly. As these arms swing downwardly, the connected toggle links 80 and 82 and 101 and 105, respectively, are gradually straightened out, causing the upper end of the locking post 61 to swing forwardly into the socket 64 at the lower end of the locking block 60 and bringing their respective teeth or lugs 76 and 75 into engagement, so that the block 60 and post 61 become in effect a continuous link by which the toggles draw the upper platen 12 downward to its finally closed position. As the toggle approach "dead center", the post 61, now being fully engaged with the block 60, will be drawn straight downward with great force to lock the mold sections together under a powerful clamping pressure.

As the cylinder 30 moves upwardly in the initial closing operation, it acts through the links 140 to rock the lever arms 136 in a counterclockwise direction, which causes the push rods 130 and 131 to move downwardly, followed by the rods 129 and the ring member 120, thus accurately positioning the tire 123 in the mold cavity of the lower mold section 20. As the closing operation continues, the upper ring member 121 approaches the tire 23, and the segments 140 thereof move inwardly a sufficient amount to permit their passage within the upper bead of the tire and to engage the corresponding base portion of the bag 128. As the cone-shaped portions 155 of the segments 142 enter the cone-shaped base wall of the lower mold section 20, said segments are forced slightly outward against the tire bead and into the exact position they should occupy during the vulcanizing operation. In the final mold clamping movement, the annular flange portion 143 and upper side of the ring body 141 enter the groove 25 in the upper mold section 21, so as properly to confine the tire for the vulcanizing operation. At or near the end of the press closing operation, the valve 166 is actuated to inflate the bag 128 and expand the tire 23 under the desired pressure against the heated walls of the mold cavity 22 to effect vulcanization of the rubber.

After the tire has been subjected to such pressure and heat for a sufficient length of time, the operator actuates the valve 166 to deflate the bag 128, and draws the valve handle 46 forwardly to acutate the valve 45 for the admission of pressure to the lower end of the cylinder 30 and for the exhaust of pressure from the upper end of said cylinder. As the cylinder pressure is thus reversed, the piston 40 moves upwardly until it is arrested by the engagement of the piston rod 39 with the stop 49. This upward movement of the piston rod 39 swings the arms 82ª and 95 upwardly, breaking the power of the two sets of the toggles, and causing the locking post 61 first to move bodily upward in breaking the mold sections apart (Fig. 2), and its upper end then to swing rearwardly out of the socket 74 in breaking connection with the locking block 60. Continued pressure in the lower end of the cylinder 30 now causes the cylinder to move bodily downward with reference to the arrested piston 40, as previously explained, thereby swinging the upper platen 12 to its fully open position.

As the cylinder thus moves downwardly, it acts through the links 140, levers 136, and push rods 130 and 131 to strip the tire 23 from the cavity of the lower mold section (Fig. 3), and at the same time the upper ring member 121 is forced out of its seating groove 25 in the upper mold section by the action of the springs 170, leaving the tire freely supported by the lower ring member 120 and entirely out of contact with any of the heated walls of the mold. The operator then disconnects the coupling 165 from the inflation valve stem 163, whereupon he can with ease remove the vulcanized tire from the supporting ring 120 and replace it with another unvulcanized tire, after which the above described cycle of operations may be repeated.

From the foregoing it will be evident that an improved vulcanizing press has been provided, in which the mold sections are tightly drawn together and locked in closed relation by a novel power mechanism, and furthermore, that the insertion and removal of the tires are greatly facilitated by mechanical manipulation. While the press has been disclosed as equipped for manual control, it is equally well adapted for automatic control by a time measuring mechanism, such that the press will be automatically opened and the vulcanized tire automatically stripped from the mold cavity at the end of a definite time period. In fact, the invention is susceptible of numerous modifications in the details of construction and in the arrangements of parts, and the right is herein reserved to make such changes as fall within the scope of the appended claims without departing from the spirit of the invention.

While the improved press has been shown herein as adapted to tire molds, it should be understood that it may be used in connection with molds for other articles. In the appended claims, of course, the reference to platens is intended to apply to any form of mold supporting member and not merely to a flat bed or plate such as shown.

Having thus described my invention, what I claim is:

1. A vulcanizing press comprising a pair of opposed platens, one fixed and the other movable, a powerful toggle system comprising unconnected toggle members for clamping the two platens tightly together in the closed condition of the press, and a second less powerful toggle system for forcing the platens apart in the initial opening of the press.

2. A vulcanizing press comprising a pair of opposed platens, one fixed and the other movable, and two distinct toggle systems, one more powerful than the other, for clamping the two platens tightly together in the closed condition of the press and comprising unconnected toggle members, the less powerful of said toggle systems being operative independently in the initial opening of the press to force the platens apart.

3. A vulcanizing press as in claim 2, including, as an additional element, common means for operating both of said toggle systems in unison.

4. A vulcanizing press as in claim 2, including, as an additional element, a pressure cylinder for operating both of said toggle systems in unison.

5. A vulcanizing press comprising a pair of opposed platens, one fixed and the other movable, a toggle system for clamping the two platens tightly together in the closed condition of the press, means for automatically connecting and disconnecting the toggle system with and from the movable platen in the closing and opening of the press respectively, and means independent of the toggle system for operating the movable platen when disconnected therefrom.

6. A vulcanizing press as in claim 2, including, as additional elements, common connections between the two toggle systems and the movable platen, automatic means for making and breaking said connections in the final closing and the initial opening periods of the press respectively, and means independent of the two toggle systems for operating the movable platen when disconnected therefrom.

7. A vulcanizing press is in claim 2 wherein the toggle systems have a limited range of action, and, including, as additional elements, means for automatically connecting and disconnecting the two toggle systems with and from the movable platen in the closing and opening of the press respectively, and means for moving the movable platen toward and from the fixed platen when the toggle systems are disconnected therefrom to compensate for the limited range of action of said toggle systems.

8. A vulcanizing press as in claim 2, including, as additional elements, means for automatically connecting and disconnecting the two toggle systems with and from the movable platen in the closing and opening of the press respectively, and a pressure cylinder for moving the movable platen toward and from the fixed platen when the toggle systems are disconnected therefrom.

9. A vulcanizing press as in claim 2, including, as additional elements, means for automatically connecting and disconnecting the two toggle systems with and from the movable platen in the closing and opening of the press respectively, and unitary means for operating the two toggle systems in unison and for moving the movable platen toward and from the fixed platen when the toggle systems are disconnected therefrom.

10. A vulcanizing press as in claim 2, including, as additional elements, means for automatically connecting and disconnecting the two toggle systems with and from the movable platen in the closing and opening of the press respectively, and a pressure cylinder for operating the two toggle systems in unison and for moving the movable platen toward and from the fixed platen when the toggle systems are disconnected therefrom.

11. A vulcanizing press as in claim 2, including, as additional elements, means for automatically connecting and disconnecting the two toggle systems with and from the movable platen in the closing and opening of the press respectively, and a pressure cylinder for operating the two toggle systems in unison and for moving the movable platen toward and from the fixed platen when the toggle systems are disconnected therefrom, and characterized by the fact that the piston of the pressure cylinder operates the toggle system by its own movement within the piston, while the cylinder operates the movable platen by its own movement with reference to the piston.

12. A vulcanizing press as in claim 2, including, as additional elements, means for automatically connecting and disconnecting the two toggle systems with and from the movable platen in the closing and opening of the press respectively, and a pressure cylinder for operating the two toggle systems in unison and for moving the movable platen toward and from the fixed platen when the toggle systems are disconnected therefrom, and characterized by the fact that the movable platen is hinged with reference to the fixed platen and that the pressure cylinder is rockably supported on the movable platen by the opposite side of its hinge connection.

13. A vulcanizing press comprising a pair of opposed platens, one fixed and the other movable, means for opening and closing the press, a toggle system operative to clamp the two platens tightly together in the closed condition of the press and to force the platens apart in the initial opening of the press, and power means for operating said toggle system at the proper time.

14. A vulcanizing press comprising a pair of opposed platens, one fixed and the other movable, a toggle system operative to clamp the two platens tightly together in the closed condition of the press and to force the platens apart in the initial opening of the press, and a pressure cylinder for opening and closing the press independently of the toggle system and for operating said toggle system at the proper time.

15. A vulcanizing press according to claim 14, wherein the movable platen is hinged with reference to the fixed platen, and characterized by the fact that the pressure cylinder is rockably supported on the hinged platen and has its piston connected to the toggle system.

16. A vulcanizing press comprising a pair of opposed platens, one fixed and the other movable, a toggle system for clamping the two platens tightly together in the closed condition of the press, power means for operating said toggle system, a link for connecting the toggle system with the movable platen, said link comprising one section carried by the movable platen and another section permanently connected with the toggle system, and automatic means for moving one of said link sections into and out of engagement with the other in the final closing and the initial opening of the press respectively.

17. A vulcanizing press according to claim 16, characterized by the fact that the engagement and disengagement of the two link sections is effected by the movement of the second-mentioned section.

18. A vulcanizing press according to claim 16, characterized by the fact that the engagement and disengagement of the two link sections is effected by the movement of the second-mentioned section under the control of the toggle system.

19. A vulcanizing press according to claim 16, characterized by the fact that the engagement and disengagement of the two link sections is effected by the movement of the second-mentioned section under the control of the toggle system, and a swinging guide arm connected to the second link section at a point beyond its pivotal connection with the toggle system.

20. A vulcanizing press according to claim 16, characterized by the fact that one of the link sections is adjustable axially to vary the effective length of the link so as thus to vary the clamping pressure exerted by the toggle system.

21. A vulcanizing press according to claim 16, wherein the movable platen is hinged with reference to the fixed platen, and characterized by the fact that the power means therein referred to is in the form of a pressure cylinder rockably mounted on the hinged section and having its piston connected to the toggle system.

22. A vulcanizing press comprising a lower fixed annular platen and an upper movable annular platen, and axially arranged means including a toggle system located wholly below the lower fixed platen for drawing the platens together with a clamping pressure when the press is closed.

23. A vulcanizing press comprising a lower fixed annular platen and an upper movable annular platen, and axially arranged means including a toggle system located wholly below the lower fixed platen for forcing the platens apart when the press is opened.

24. A vulcanizing press comprising a lower fixed annular platen and an upper movable annular platen, and axially disposed means including a toggle system located wholly below the fixed platen for drawing the platens together under a clamping pressure when the press is closed and for forcing the platens apart when the press is opened.

25. A vulcanizing press comprising a pair of opposed platens, a pressure cylinder operative independently to move one of said platens toward and from the other, and centrally located locking means including a toggle system for tightly closing the press, said toggle system having operative connection with said pressure cylinder.

26. A vulcanizing press comprising a pair of opposed platens, a pressure cylinder operative independently to move one of said platens toward and from the other, and centrally acting means operable from said pressure cylinder to break the press open.

27. A vulcanizing press comprising a pair of opposed platens, a pressure cylinder operative independently to move one of said platens toward and from the other, and centrally acting means including a toggle system operated by said pressure cylinder to draw the platens tightly together in closing the press, and to force the platens apart in opening the press.

28. A vulcanizing press comprising a lower fixed platen, an upper movable platen, a substantially central locking lug member depending from the swinging platen, a locking post extending through the fixed platen and adapted for detachable engagement with said locking lug member, means supporting said locking post for a combined swinging and endwise movement, and power mechanism for actuating said locking post.

29. A vulcanizing press comprising a lower fixed platen, an upper movable platen, toggle mechanism located below the fixed platen and arranged to act substantially centrally on the upper platen to force the platens apart in opening the press, and operative connections between the toggle mechanism and the upper platen, said connections extending through both platens.

30. A vulcanizing press comprising a lower fixed platen, an upper movable platen, toggle mechanism located below the fixed platen and arranged to act substantially centrally on the upper platen to draw the two tightly together in the closed condition of the press, and operative connections between the toggle mechanism and the upper platen, said connections extending to both platens.

31. A vulcanizing press comprising a lower fixed platen, an upper swinging platen hinged with reference thereto, and a pressure cylinder connected to the swinging platen for moving it toward and from the fixed platen, said pressure cylinder being movable bodily with the swinging platen so as partly to counterbalance the weight thereof.

32. A vulcanizing press comprising a lower fixed platen, and upper swinging platen hinged with reference thereto, means including a pressure cylinder and its cooperating piston for actuating the swinging platen, said piston being movable within the cylinder during a portion of the stroke, and the cylinder being bodily movable on the piston during the remainder of the stroke, means actuated by the movement of the cylinder for operating the upper swinging platen, and means actuated by the movement of the piston for locking and unlocking the press.

33. A vulcanizing press comprising a lower fixed platen, an upper swinging platen hinged with reference thereto, arms associated with the swinging platen and extending rearwardly from the hinge connection, a pressure cylinder pivotally mounted in the ends of said arms, a piston disposed within said cylinder, and means for holding the piston against endwise movement, whereby pressure within the cylinder will cause the cylinder to move with reference to the piston in moving the swinging mold section.

34. A vulcanizing press comprising a lower fixed platen, an upper swinging platen hinged with reference thereto, arms associated with the swinging platen and extending rearwardly from the hinge connection, a pressure cylinder pivotally mounted in the ends of said arms, a piston disposed within said cylinder, centrally located means for clamping the swinging platen in closed relation to the fixed platen, means including a toggle connecting said locking means with said piston, and means for limiting the movement of the piston, whereby during a portion of the stroke, the piston will be stationary and the cylinder will move with reference thereto, as and for the purpose described.

35. A vulcanizing press comprising a lower fixed platen, an upper swinging platen hinged with reference thereto, a centrally located socket member depending from the swinging platen, a locking post associated with the fixed platen, said locking post being adapted to be moved into and out of said socket member when the press is closed, and being provided with lugs for engaging portions of the socket member to hold the swinging platen against opening movement and a single power means for moving the swinging platen and the locking post.

36. A vulcanizing press comprising a lower fixed platen, an upper swinging platen hinged with reference thereto, a centrally located socket member depending from the swinging platen, and a locking post associated with the fixed platen and movable into and out of said socket member when the press is closed, said post and socket member being provided with cooperating buttress-shaped lugs to prevent opening of the press when the post is engaged within the socket member.

37. A vulcanizing press comprising a lower fixed platen, an upper swinging platen hinged with reference thereto, a centrally located socket member depending from the swinging platen, and a locking post associated with the fixed platen and movable into and out of said socket member when the press is closed, said post and socket member being provided with cooperating buttress-shaped lugs to prevent opening of the press when the post is engaged within the socket member, and power mechanism for moving the post endwise to close the press tightly in the final closing movement and to break the press open in the initial opening movement.

38. A vulcanizing press comprising a lower fixed platen, an upper swinging platen hinged with reference thereto, a centrally located locking block depending from the swinging platen and formed in one side and at its lower end with a socket having a series of lugs formed in its wall, a locking post extending upwardly through the fixed platen and having a series of lugs on its sides adjacent the upper end to engage those in the socket when the press is closed, and power means for drawing the locking post downwardly when engaged with the locking block to clamp the two platens tightly together.

39. A vulcanizing press comprising a lower fixed platen, an upper swinging platen hinged with reference thereto, a centrally located locking block depending from the swinging platen and formed in one side and at its lower end with a socket having a series of lugs formed in its wall, a locking post extending upwardly through the fixed platen and having a series of lugs on its upper end to engage those in the socket when the press is closed, and power means for moving the locking post both downwardly and upwardly when said lugs are engaged so as to clamp the two platens together and to force them apart, respectively.

40. A vulcanizing press as defined in claim 35, wherein the locking post is pivotally attached at its lower end to a swinging guide arm.

41. A vulcanizing press as defined in claim 35, wherein the locking post is connected to a toggle system actuated by a pressure cylinder.

42. A tire vulcanizing press comprising a fixed annular mold section, a movable cooperating annular mold section, a tire supporting rim arranged to seat in the respective mold sections at their inner peripheries, said rim being composed of two separate ring members, one carried by the movable mold section, and the other associated with the fixed mold section, and automatic means for shifting the ring member of the fixed mold section into and out of the same in the closing and opening of the press, the said two ring members being beveled or cone-shaped, one at its inner periphery and the other at its outer periphery, so as to fit one within the other in the closed condition of the press.

43. A tire vulcanizing press comprising a fixed annular mold section, a movable cooperating annular mold section, a tire supporting rim arranged to seat in the respective mold sections at their inner peripheries, said rim being composed of two separate ring members, one carried by the movable mold section and made up of a plurality of segments to enable it to be contracted and expanded, and the other being associated with the fixed mold section, and automatic means for shifting the ring member of the fixed mold section into and out of the same in the closing and opening of the press.

44. A tire vulcanizing press comprising a fixed annular mold section, a movable cooperating annular mold section, a tire supporting rim arranged to seat in the respective mold sections at their inner peripheries, said rim being composed of two separate ring members, one of which is carried by the movable mold section and is shiftable into and out of the same in the closing and opening movements of the press, and is made up of a plurality of segments to enable it to be expanded and contracted as it is shifted into and out of said mold section, the other ring member being associated with the fixed mold section, and automatic means for shifting the ring member of the fixed mold section into and out of the same in the closing and opening of the press.

PETER DE MATTIA.